United States Patent
Fujibayashi et al.

[11] Patent Number: 5,995,131
[45] Date of Patent: Nov. 30, 1999

[54] IMAGING LENS SYSTEM OF SCANNING OPTICAL APPARATUS

[75] Inventors: Kazuo Fujibayashi, Kawasaki; Koji Hoshi, Yokohama; Manabu Kato; Yoshihiro Ishibe, both of Kawasaki, all of Japan

[73] Assignee: Canon Kabushiki Kaisha, Tokyo, Japan

[21] Appl. No.: 08/991,611

[22] Filed: Dec. 16, 1997

[30] Foreign Application Priority Data

Dec. 19, 1996 [JP] Japan .................................. 8-354464
Mar. 13, 1997 [JP] Japan .................................. 9-078932

[51] Int. Cl.$^6$ .................................................. G02B 26/08
[52] U.S. Cl. ......................... 347/258; 347/241; 347/244; 359/205; 359/206; 359/662; 359/691
[58] Field of Search .................................... 347/241, 244, 347/256, 258, 259; 359/205, 206, 207, 217, 218, 662, 691

[56] References Cited

U.S. PATENT DOCUMENTS

| | | | |
|---|---|---|---|
| 4,846,539 | 7/1989 | Takahashi et al. | 359/207 |
| 4,864,419 | 9/1989 | Saito et al. | 358/300 |
| 5,111,219 | 5/1992 | Makino | 347/259 |
| 5,179,465 | 1/1993 | Kondo | 359/218 |
| 5,182,575 | 1/1993 | Kato et al. | 347/240 |
| 5,189,546 | 2/1993 | Iizuka | 359/217 |
| 5,436,645 | 7/1995 | Uemura et al. | 346/107.1 |
| 5,557,446 | 9/1996 | Kato | 359/206 |
| 5,652,670 | 7/1997 | Kayashi | 359/205 |
| 5,691,835 | 11/1997 | Iizuka | 359/206 |
| 5,694,236 | 12/1997 | Sekikawa | 359/206 |
| 5,859,720 | 1/1999 | Ishibe | 359/196 |

FOREIGN PATENT DOCUMENTS

| | | |
|---|---|---|
| 0 730 182 | 9/1996 | European Pat. Off. . |
| 56-36622 | 4/1981 | Japan . |
| 57-035825 | 2/1982 | Japan . |
| 57-144514 | 9/1982 | Japan . |
| 61-48684 | 3/1986 | Japan . |
| 61-175607 | 8/1986 | Japan . |
| 63-157122 | 6/1988 | Japan . |
| 4-50908 | 2/1992 | Japan . |
| 4-104213 | 4/1992 | Japan . |

*Primary Examiner*—N. Le
*Assistant Examiner*—Hai C. Pham
*Attorney, Agent, or Firm*—Fitzpatrick, Cella, Harper & Scinto

[57] ABSTRACT

A scanning optical apparatus includes a light source device, a first optical element for converting a beam emitted from the light source device to a converging light beam, a deflecting element for deflecting the beam emitted from the light source device, a second optical element for focusing the beam emerging from the first optical element in a linear shape longitudinal in a main scanning direction on a deflective face of the deflecting element, and a third optical element for focusing the beam deflected by the deflecting element in a spot shape on a scanned surface. The third optical element has a spherical lens and a toric lens in order from the side of the deflecting element, surfaces of the spherical lens comprise a meniscus shape of positive refracting power with a concave surface faced toward the deflecting element, and the toric lens has two lens surfaces formed in aspherical shapes in a main scanning section and comprising a meniscus shape of positive refracting power with a convex surface faced toward the deflecting element in the vicinity of a center of scan.

38 Claims, 11 Drawing Sheets

IMAGING LENS SYSTEM OF SCANNING OPTICAL APPARATUS

BACKGROUND OF THE INVENTION

1. Field of the Invention

The present invention relates to a scanning optical apparatus and, more particularly, to a scanning optical apparatus suitably applicable to devices arranged to deflect and reflect light optically modulated and emitted from light source means, by an optical deflector comprised of a rotary polygon mirror, etc., and thereafter to make the light scan an area on a scanned surface through an imaging optical system (fθ lens) having the fθ characteristic to record image information thereon, for example, such as laser beam printer apparatus (LBP) or digital copiers having the electrophotographic process.

2. Related Background Art

In the conventional scanning optical apparatus such as the laser beam printers, the beam optically modulated according to an image signal and emitted from the light source means is regularly deflected by the optical deflector, for example, comprised of a rotary polygon mirror (polygon mirror), the beam is converged in a spot shape on a surface of a photosensitive recording medium (photosensitive drum) by the imaging optical system having the fe characteristic, and the beam is made to optically scan the area on the surface to undergo image recording.

FIG. 1 is a schematic drawing to show the major part of a conventional scanning optical apparatus, which is a cross—sectional view thereof in the main scanning direction. In the drawing diverging light emitted from the light source means 11 is converted into a nearly parallel beam by collimator lens 12, stop 13 limits the beam (quantity of light), and then the beam is incident to cylindrical lens 14 which has predetermined refracting power only in the sub scanning direction. The parallel beam incident to the cylindrical lens 14 is emergent in the state of parallel rays as it is, in the main scanning section. In the sub scanning section the beam is converged to be focused as a nearly linear image on a deflective surface (reflective surface) 15a of the optical deflector 15 comprised of the rotary polygon mirror (polygon mirror).

Then the beam deflected by the deflective surface 15a of optical deflector 15 is guided through the imaging optical system (fθ lens) 16 having the fθ characteristic onto the surface of photosensitive drum 18 as a scanned surface and the beam is made to optically scan the area on the surface of photosensitive drum 18 by rotating the optical deflector 15 in the direction of arrow A, thereby performing recording of image information.

In order to undergo highly accurate recording of image information, the scanning optical apparatus of this type needs to be well corrected for curvature of field throughout the entire region of the scanned surface so as to have uniform spot diameters and needs to have distortion (the fθ characteristic) for achieving the proportional relation between angle of incident light and height of image. A variety of scanning optical devices or correction optical systems (fθ lenses) thereof satisfying such optical characteristics have been proposed heretofore.

On the other hand, as the scale and cost of the laser beam printers, digital copiers, etc. are decreasing, the scanning optical apparatus is also required to decrease the same.

For simultaneously meeting these demands, various scanning optical devices comprised of a single fθ lens were proposed, for example, in Japanese Patent Publication No. 61-48684, Japanese Laid-open Patent Application No. 63-157122, Japanese Laid-open Patent Application No. 4-104213, Japanese Laid-open Patent Application No. 4-50908 (corresponding to U.S. Pat. No. 5,111,219), and so on.

Japanese Patent Publication No. 61-48684, Japanese Laid-open Patent Application No. 63-157122, etc., out of these patents and applications, disclose that the parallel beam from the collimator lens is converged on the surface of recording medium by use of a single lens with a concave surface on the optical deflector side as an fθ lens. Further, Japanese Laid-open Patent Application No. 4-104213 discloses that a single lens with a concave surface on the optical deflector side and a toroidal surface on the image plane side is used as an fθ lens and a beam, which was converted into converging light by the collimator lens, is made incident to the fθ lens. Japanese Laid-open Patent Application No. 4-50908 (corresponding to U.S. Pat. No. 5,111,219) discloses that a single lens with lens surfaces being higher-order aspherical surfaces is used as an fθ lens and the beam, which was converted into the converging light by the collimator lens, is made incident to the fθ lens.

The conventional scanning optical devices as described above, however, had the following problems. In the apparatus of Japanese Patent Publication No. 61-48684, the curvature of field remains in the sub scanning direction; and, because the parallel beam is focused on the scanned surface, the focal length f, a distance from the fθ lens to the scanned surface, is long, thus posing the problem that it is difficult to construct a compact scanning optical device.

The apparatus of Japanese Laid-open Patent Application No. 63-157122 had the problem that it was difficult to produce the fO lens by molding because the thickness thereof was large and it was the cause of increase in the cost.

The apparatus of Japanese Laid-open Patent Application No. 4-104213 had the problems that distortion remained and that jitter occurred in the period of the number of polygon faces because of a mounting error of the polygon mirror being the optical deflector.

In the apparatus of Japanese Laid-open Patent Application No. 4-50908, aberration was well corrected for by use of the fθ lens of higher-order aspherical surfaces, whereas spot diameters in the sub scanning direction tended to vary depending upon heights of image because of nonuniformity of magnification in the sub scanning direction between the optical deflector and the scanned surface.

In addition to the above, the scanning optical devices with the fθ lens comprised of two lenses were proposed, for example, in Japanese Laid-open Patent Application No. 56-36622, Japanese Laid-open Patent Application No. 61-175607, and so on. The fθ lenses proposed in these were constructed in a cross-sectional shape composed of spherical surfaces or weak aspherical surfaces, and with these fθ lenses it seemed rather difficult to decrease the scale, decrease the cost, and increase the definition.

SUMMARY OF THE INVENTION

An object of the present invention is to provide a scanning optical apparatus that is compact and suitable for high-definition printing, wherein, for focusing the converging light from the collimator lens on the scanned surface by the fθ lens having two lenses via the optical deflector, lens configurations of the two lenses forming the fθ lens are arranged adequately, whereby curvature of field and distortion are well corrected for and the change of spot diameter depending upon the image heights is prevented.

A scanning optical apparatus of the present invention is a scanning optical apparatus comprising a first optical element for converting a beam emitted from light source means to a converging light beam, a second optical element for focusing the beam in a linear shape longitudinal in the main scanning direction on a deflective face of a deflecting element, and a third optical element for focusing a beam deflected by the deflecting element in a spot shape on a scanned surface, wherein the third optical element has a spherical lens and a toric lens in order from the side of the deflecting element, surfaces of the spherical lens comprise a meniscus shape of positive refracting power with a concave surface faced toward the deflecting element, and the toric lens has two lens surfaces formed in aspherical shapes in a main scanning section and comprising a meniscus shape of positive refracting power with a convex surface faced toward the deflecting element in the vicinity of the center of scan.

The scanning optical apparatus of the present invention is characterized, particularly, in that the aforementioned toric lens is constructed so that in the main scanning section curvatures of the lens surface on the aforementioned scanned surface side continuously change from the center of lens to the periphery of lens and signs thereof are inverted in an intermediate portion;

in that the aforementioned toric lens is produced by molding of plastic;

in that the aforementioned toric lens is constructed so that curvatures of at least one lens surface out of the lens surfaces on the aforementioned deflecting element side or on the scanned surface side in sub scanning sections change continuously along the main scanning direction;

in that the curvatures of said at least one lens surface change continuously along the main scanning direction in plane symmetry of the lens center;

in that the aforementioned toric lens is constructed so that the symmetry axis of the main scanning direction thereof is inclined in a main scanning plane with respect to the normal of said scanned surface;

in that when focal lengths of the aforementioned spherical lens and aforementioned toric lens in the main scanning section are f6 and f7, respectively, they satisfy the following condition:

$1.6 < f6/f7 < 2.4$;

in that the aforementioned toric lens is decentered in parallel toward the light source means in the main scanning section;

in that the third optical element is constructed so that when an angular magnification of an effective image center portion on the scanned surface in a sub scanning section between the aforementioned deflecting element and the aforementioned scanned surface is $r_{sc}$, the angular magnification satisfies the following condition:

$0.25 < r_{sc} < 0.67$; or in that refracting power of the aforementioned toric lens in a sub scanning section becomes continuously weaker from the center of lens to the periphery of lens and in that the third optical element is constructed so that when an angular magnification of an effective image center portion on the scanned surface in a sub scanning section between the aforementioned deflecting element and the scanned surface is $r_{sc}$ and an angular magnification at an arbitrary position in the entire region of image is $r_{s0}$, the angular magnifications satisfy the following condition:

$0.9 < r_{s0}/r_{sc} < 1.25$.

Another scanning optical apparatus of the present invention is a scanning optical apparatus comprising a first optical element for converting a beam emitted from light source means to a converging light beam, a second optical element for focusing the beam in a linear shape longitudinal in the main scanning direction on a deflective surface of a deflecting element, and a third optical element for focusing a beam deflected by the deflecting element in a spot shape on a scanned surface, wherein the third optical element has a spherical lens and a toric lens in order from the side of the deflecting element, the spherical lens is formed in a meniscus shape of positive refracting power with a concave surface faced toward the deflecting element, and the toric lens has two lens surfaces formed in aspherical shapes in a main scanning section and comprising a meniscus shape of positive refracting power with a convex surface faced toward the deflecting element in the vicinity of the center of scan, and wherein when focal lengths of the spherical lens and the toric lens in the main scanning section are f6 and f7, respectively, they satisfy the following condition:

$1 < f6/f7 < 10$.

The above scanning optical apparatus of the present invention is characterized, particularly, in that the aforementioned toric lens is constructed so that in the main scanning section curvatures of the lens surface on the aforementioned scanned surface side continuously change from the center of lens to the periphery of lens and signs thereof are inverted in an intermediate portion;

in that the aforementioned toric lens is produced by molding of plastic;

in that the aforementioned toric lens is constructed so that curvatures of at least one lens surface out of the lens surfaces on the aforementioned deflecting element side or on the scanned surface side in sub scanning sections change continuously along the main scanning direction;

in that the curvatures of said at least one lens surface change continuously along the main scanning direction in plane symmetry of the lens center;

in that the aforementioned toric lens is constructed so that the symmetry axis of the main scanning direction thereof is inclined in a main scanning plane with respect to the normal of said scanned surface;

in that aforementioned toric lens is decentered in parallel toward the light source means in the main scanning section;

in that the third optical element is constructed so that when an angular magnification of an effective image center portion on the scanned surface in a sub scanning section between the aforementioned deflecting element and the aforementioned scanned surface is $r_{sc}$, the angular magnification satisfies the following condition:

$0.25 < r_{sc} < 0.67$; or in that refracting power of the aforementioned toric lens in a sub scanning section becomes continuously weaker from the center of lens to the periphery of lens and in that the third optical element is constructed so that when an angular magnification of an effective image center portion on the scanned surface in a sub scanning section between the aforementioned deflecting element and the scanned surface is $r_{sc}$ and an angular magnification at an arbitrary position in the entire region of image is $r_{s0}$, the angular magnifications satisfy the following condition:

$$0.9 < r_{s0}/r_{sc} < 1.25.$$

DETAILED DESCRIPTION OF THE PREFERRED EMBODIMENTS

Figure 1:
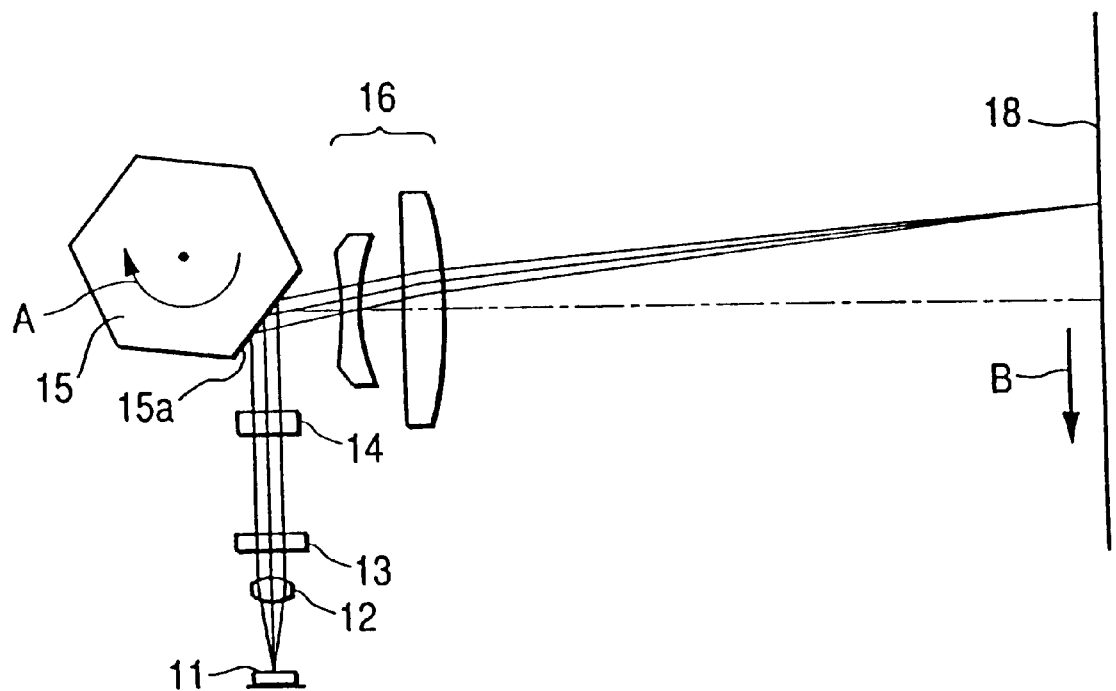
FIG. 1 is a schematic drawing to show the major part of an optical system of a conventional scanning optical apparatus.
Figure 2:
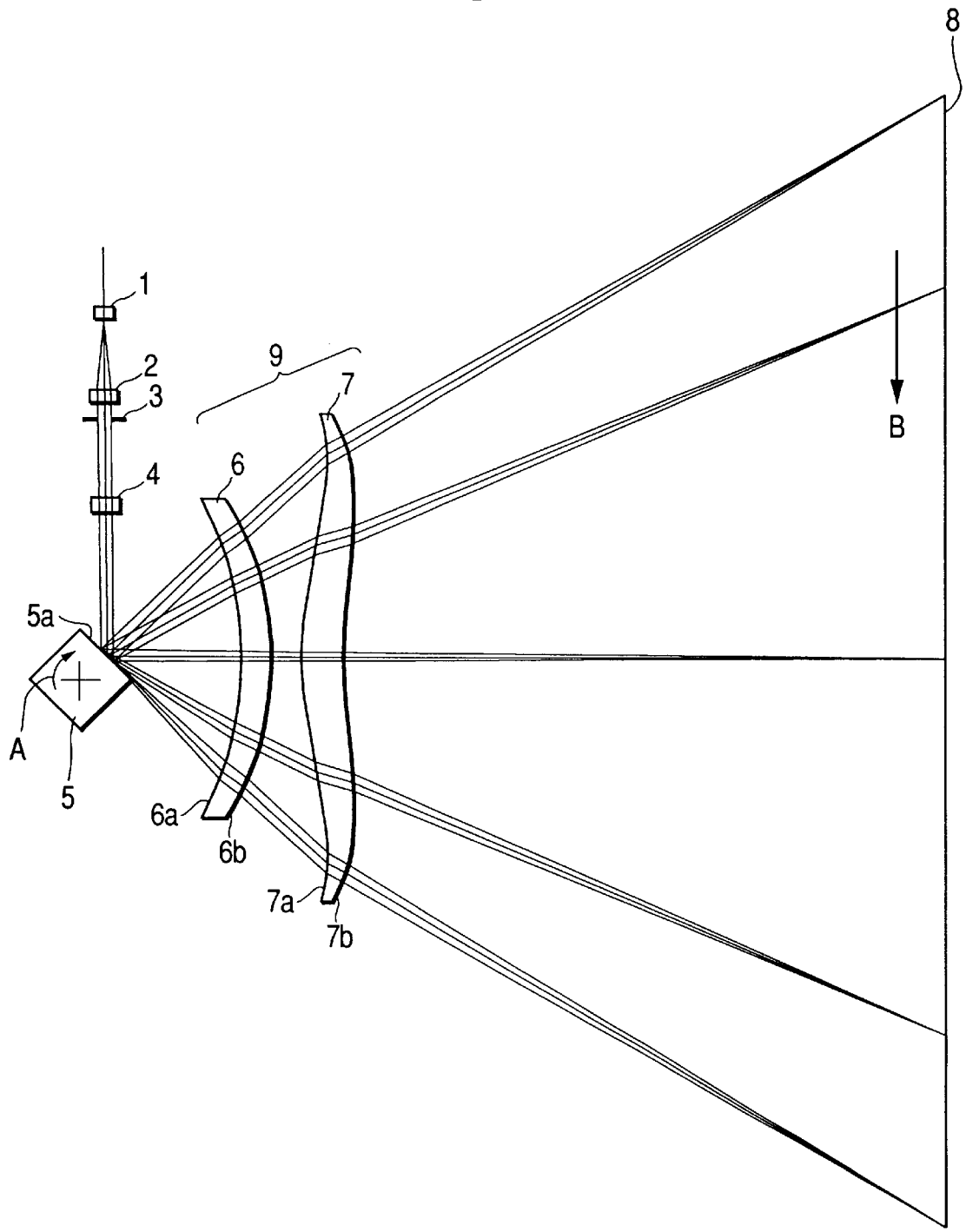
FIG. 2 is a cross-sectional view of the major part in the main scanning direction of Embodiment 1 of the scanning optical apparatus of the present invention.

FIG. 2 is a cross-sectional view of the major part in the main scanning direction (in a main scanning section) of Embodiment 1 of the scanning optical apparatus according to the present invention.

In this specification "main scanning direction" means a direction in which the beam is deflected to scan by, deflectively reflective surface of the optical deflector. Further, "main scanning plane" means a beam plane formed as a function of time by the beam deflected to scan by the deflectively reflective surface of the optical deflector.

In the drawing, reference numeral 1 designates the light source means, which is comprised, for example, of a semiconductor laser. Numeral 2 denotes a collimator lens as a first optical element, which converts a beam (an optical beam) emitted from the light source means 1 to a converging light beam in the main scanning plane. Numeral 3 denotes an aperture stop, which uniformly limits the diameter of the passing beam.

Numeral 4 represents a cylindrical lens as a second optical element, which has predetermined refracting power only in the sub scanning direction (the direction normal to the plane of FIG. 2) and which focuses the beam passing through the stop 3 in the form of a nearly linear image on the deflectively reflective surface 5a of the optical deflector 5, described below, in a sub scanning section perpendicularly intersecting the main scanning section and including the optical axis. Accordingly, the beam incident to the optical deflector 5 is a linear image longitudinal in the main scanning direction.

Numeral 5 indicates the optical deflector, for example, comprised of a polygon mirror (rotary polygon mirror) composed of four faces, which is rotated at constant speed in the direction of arrow A in the drawing by driving means (not illustrated) such as a motor.

Numeral 9 denotes an fθ lens (imaging optical system) having the fθ characteristic as a third optical element. The third optical element 9 has a spherical lens 6 and a toric lens 7. The third optical element 9 focuses the beam according to image information, deflectively reflected by the optical deflector 5, on a surface of photosensitive drum 8 being a recording medium as a scanned surface and corrects for face inclination of the deflective surface of the optical deflector 5.

In the present embodiment the beam emitted from the semiconductor laser 1 is converted to the converging light beam in the main scanning section by the collimator lens 2, the beam (quantity of light) is limited by the aperture stop 3, and the beam is made incident to the cylindrical lens 4. The beam incident to the cylindrical lens 4 emerges therefrom as it is, in the main scanning section. On the other hand, in the sub scanning section the beam is converged to be focused in the form of a nearly linear image (a linear image longitudinal in the main scanning direction) on the deflective surface 5a of the optical deflector 5. Then the beam deflectively reflected by the deflective face 5a of the optical deflector 5 is guided through the fθ lens 9 onto the surface of photosensitive drum 8, and the area on the surface of photosensitive drum 8 is optically scanned in the direction of arrow B by rotating the optical deflector 5 in the direction of arrow A. This achieves image recording.

Next described are features of the spherical lens 6 and toric lens 7 composing the third optical element (fθ lens) 9 in the present embodiment.

The third optical element 9 is composed of the two lenses, the spherical lens 6 and toric lens 7, each having positive refracting power, and distribution of refracting power of the two lenses is adequately determined in this case, thereby achieving a good curvature-of-field characteristic.

When the focal lengths of the spherical lens 6 and toric lens 7 in the main scanning section in this case are f6 and f7, respectively, they are determined to satisfy the following condition:

$$1 < f6/f7 < 10 \qquad (1)$$

When this condition equation (1) is satisfied, curvature of field and distortion are well corrected for. This also decreases thicknesses of the both spherical lens 6 and toric lens 7, decreases the cycle time upon production thereof by molding of plastic or molding of glass (glass mold), and decreases deformation of surface shape upon cooling thereof.

In the present embodiment a more preferable numerical range of condition equation (1) is as follows:

$$1.1 < f6/f7 < 8.5 \qquad (1a).$$

Particularly, better optical performance can be attained by the following range:

$$1.6 < f6/f7 < 2.4 \qquad (1b).$$

If the fθ lens 9 were composed of one toric lens, it would be difficult to maintain spot diameters uniform over the entire region on the scanned surface and to maintain variation in curvature of field in good order, by only two lens surfaces of the toric lens 7.

In the present embodiment, therefore, the spherical lens 6 is formed in the meniscus shape of positive refracting power with a concave surface faced toward the deflecting element 5, thereby well correcting for the curvature of field in this case.

For mainly maintaining the fθ characteristic and curvature-of-field characteristic both in good order, the toric lens 7 is constructed in the main scanning section (in the plane of FIG. 2) in such arrangement:

that the both lens surfaces 7a, 7b are aspherical;

that it is formed in the meniscus shape of positive refracting power with a convex surface faced toward the deflecting element 5 in the vicinity of the center of scan (the center of the lens); and that curvatures in the main scanning direction of the lens surface 7b on the scanned surface 8 side continuously change from the center of the lens (the center of the main scanning range) to the periphery of the lens and signs (positive and negative signs) thereof are inverted in the intermediate portion.

The toric lens 7 as described well corrects for the curvature of field and distortion in the entire scanning range by being constructed in the above shape.

Further, curvatures of the both lens surfaces 7a, 7b in sub scanning sections (cross sections perpendicularly intersecting the main scanning section and including the optical axis) of the toric lens 7 are arranged to continuously change in plane symmetry according to distances in the main scanning direction from the center of the lens. Image characteristics in the sub scanning direction are maintained good by this arrangement.

The fθ lens 9 is constructed so that when the angular magnification of the effective image center portion on the scanned surface 8 in the sub scanning section between the optical deflector 5 and the scanned surface 8 is $r_{sc}$, the angular magnification is arranged to satisfy the following condition:

$$0.25 < r_{sc} < 0.67 \qquad (2).$$

This condition equation (2) is a condition for maintaining good image characteristics in the sub scanning section while restricting the lens length of the fθ lens 9 in the main scanning direction. Below the lower limit of condition equation (2), the effective beam by the spherical lens 6 and toric lens 7 will be expanded and the thicknesses of the lenses will increase, thus resulting in losing compactness of the lenses. This is not preferable. Above the upper limit of condition equation (2), the image performance of the fθ lens 9 composed of the plastic lenses will become unstable depending upon environmental changes such as temperature changes. This is not preferable, either.

Further, the refracting power of the toric lens 7 in the sub scanning section in the present embodiment is arranged to continuously become weaker from the center of the lens to the periphery of the lens, and the fθ lens 9 is arranged to satisfy the following condition when the angular magnification of the effective image center portion on the scanned surface 8 in the sub scanning section between the optical deflector 5 and the scanned surface 8 is $r_{sc}$ and an angular magnification at an arbitrary position in the entire image region is $r_{s0}$:

$$0.9 < r_{s0}/r_{sc} < 1.25 \qquad (3).$$

This condition equation (3) is a condition for uniforming the spot diameters in the sub scanning section from the central portion to the periphery of the scanned surface 8 thereon. Over the upper limit of condition equation (3), spot diameters in the periphery of the scanned surface 8 (at the image edges in the main scanning direction) will become smaller than those in the central portion, which is not preferred. Under the lower limit of condition equation (3), spot diameters in the periphery of the scanned surface 8 will become greater than those in the central portion, so that uniformity of spot diameter will be lost in the sub scanning section, which is not preferred. Further, increase of spot diameter will lower the peak intensity of spot and will in turn result in dispersion of spot diameter due to dispersion of development, which is not preferred.

In the present embodiment a more preferable numerical range of condition equation (3) is set as follows:

$$0.95 < r_{s0}/r_{sc} < 1.21 \qquad (3a)$$

In the present embodiment the lens shape of the toric lens 7 in the main scanning direction is an aspherical shape that can be expressed by a function of up to degree 10 and the lens shape thereof in the sub scanning direction is a spherical surface continuously changing in the direction of height of image. For expressing the lens shape, let us define a coordinate system, for example, in such a manner that the origin is located at an intersecting point of the toric lens 7 with the optical axis, the X-axis is taken along the direction of the optical axis, the Y-axis along an axis perpendicular to the optical axis in the main scanning plane, and the Z-axis along an axis perpendicular to the optical axis in the sub scanning plane. Then the lens surface in the generating line direction corresponding to the main scanning direction can be expressed by the following equation.

$$X = (Y^2/R)/[1+\{1-(1+K)(Y/R^2)\}^{1/2}] + B_4 Y^4 + B_6 Y^6 + B_8 Y^8 + B_{10} Y^{10}$$

(where R is the radius of curvature and K, $B_4$, $B_6$, $B_8$, and $B_{10}$ are coefficients for aspherical surface.) The shape in the sub scanning section is defined so that radii of curvature thereof continuously change with change of coordinate of lens surface in the main scanning direction, and the radius of curvature r' at coordinate Y on the main scanning plane can be expressed by the following equation.

$$r' = r(1 + D_2 Y^2 + D_4 Y^4 + D_6 Y^6 + D_8 Y^8 + D_{10} Y^{10})$$

where r is the radius of curvature on the optical axis and $D_2$, $D_4$, $D_6$, $D_8$, and $D_{10}$ are coefficients.

Figure 3:
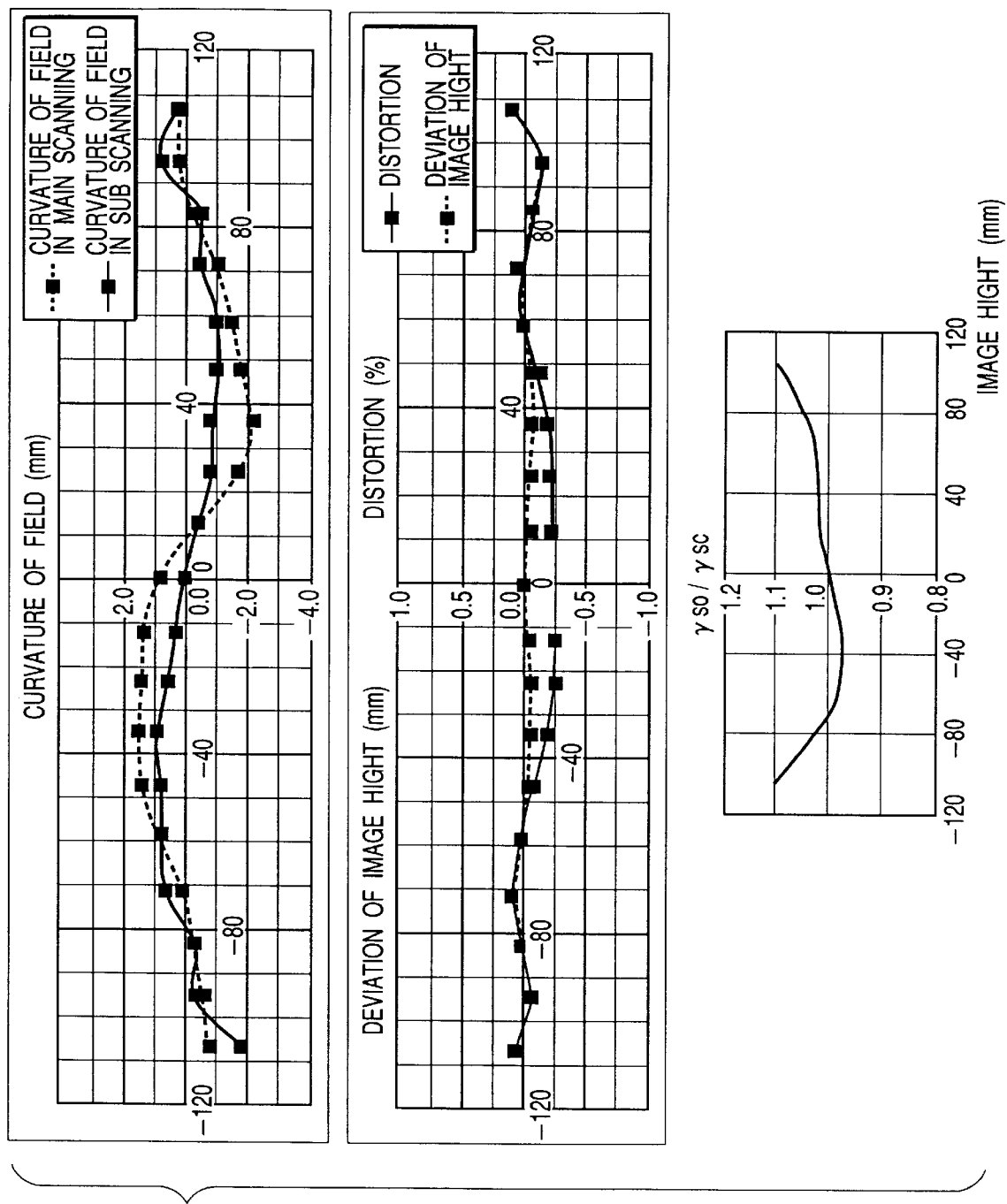
FIG. 3 is a drawing to show curvature of field, distortion, and change of angular magnification in Embodiment 1 of the present invention.

Table 1 below shows the coefficients for indicating the shapes of the lens surfaces and other various characteristics in Embodiment 1. FIG. 3 is an explanatory drawing to show aberration diagrams of curvature of field and distortion and change of angular magnification with the reference at the center in Embodiment 1. It is seen from the drawing that each of the aberrations is corrected for down to the level where there will arise no problem in practical use.

TABLE 1

(unit: mm, E-OX means "$10^{-X}$")

| | | DATA | | | |
|---|---|---|---|---|---|
| Wavelength used | λ (nm) | 780 | Shape of toric lens | | |
| | | | | First face | Second face |
| Index of spherical lens | ns | 1.5255 | R | 5.11296E + 01 | 6.91590E + 01 |
| Index of toric lens | nt | 1.5255 | K | −1.04082E + 01 | −2.06725E + 01 |
| Angle of incidence to polygon | θi | −90.0 | B4 | −1.68576E − 06 | −2.33101E − 06 |
| Max out angle from polygon | θmax | 45.0 | B6 | 1.96558E − 10 | 3.54333E − 10 |
| Polygon-spherical lens | e1 | 25.0 | B8 | −4.15803E − 14 | −1.10335E − 13 |
| Center thickness of spherical lens | d1 | 5.6 | B10 | 6.03212E − 18 | 1.67359E − 18 |
| Spherical lens-toric lens | e2 | 5.4 | r | −2.08401E + 01 | −1.05955E + 01 |
| Center thickness of toric lens | d2 | 8.0 | D2 | 4.58480E − 03 | 1.65382E − 03 |
| Toric lens-scanned surface | Sk | 113.5 | D4 | 5.74867E − 06 | −6.59308E − 07 |
| Degree of convergence by collimator | | | D6 | 2.52676E − 08 | −1.08325E − 10 |
| polygon-naturally converging point | fc | 312.06 | D8 | −4.83224E − 11 | 8.36075E − 14 |
| Radius of curvature of spherical lens R1 | R1 | −67.640 | D10 | 1.67359E − 18 | 2.26003E − 19 |
| Radius of curvature of spherical lens R2 | R2 | −59.086 | | | |
| Focal length of spherical lens | f6 | 725 | | | |
| Focal length of toric lens | f7 | 323.7 | | | |
| Ratio of the focal lengths | f6/f7 | 2.24 | | | |
| Angular magnification | rsc | 0.40 | | | |

In the present embodiment the toric lens 7 is shifted 0.5 mm in parallel toward the light source means with respect to the normal of the scanned surface 8. Further, the toric lens 7 is arranged so that the symmetry axis thereof in the main scanning direction is inclined at 25 minutes clockwise about the rotational axis passing through the top point of the lens surface on the optical deflector 5 side in the main scanning plane with respect to the normal of the scanned surface 8. The reference of the parallel shift is a principal ray parallel to the normal of the scanned surface out of principal rays reflected by the optical deflector 5.

The surface shape of the toric lens is symmetric both in the generating line direction and in the meridian line direction with respect to the optical axis of the toric lens itself in the main scanning section.

Figure 4:
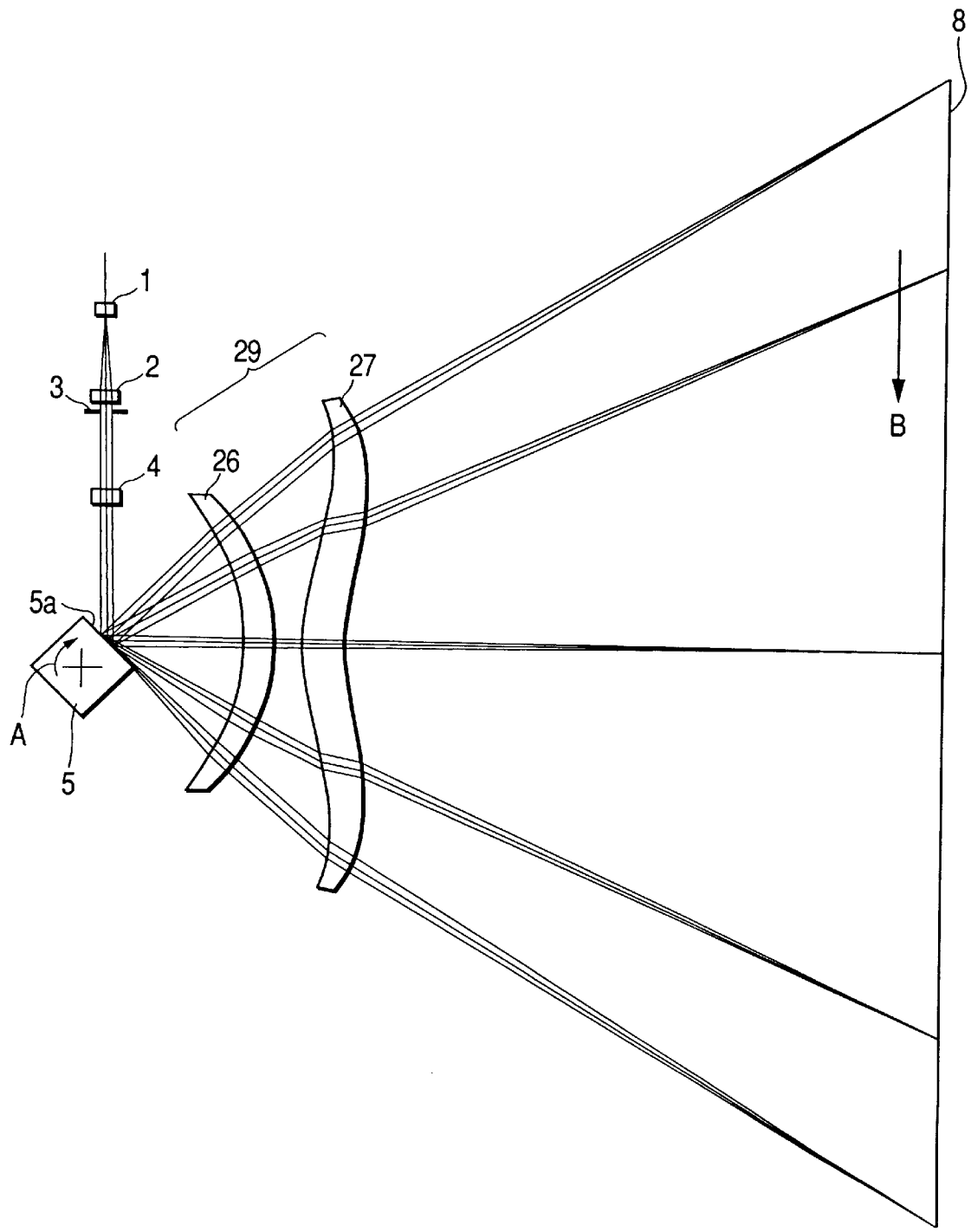
FIG. 4 is a cross-sectional view of the major part in the main scanning direction of Embodiment 2 of the scanning optical apparatus of the present invention.

FIG. 4 is a cross-sectional view of the major part in the main scanning direction (a main scanning cross-sectional view) of Embodiment 2 of the scanning optical apparatus according to the present invention. In the drawing the same elements as those shown in FIG. 2 are denoted by the same reference numerals.

The present embodiment is different from Embodiment 1 of FIG. 2 in that spherical lens 26 and toric lens 27 composing the third optical element 29 are constructed in respective lens shapes optimum for the polygon mirror composed of the four faces, as shown in Table 2 below. The other structure and optical action are substantially the same as in above Embodiment 1, thereby achieving the same effect.

Figure 5:
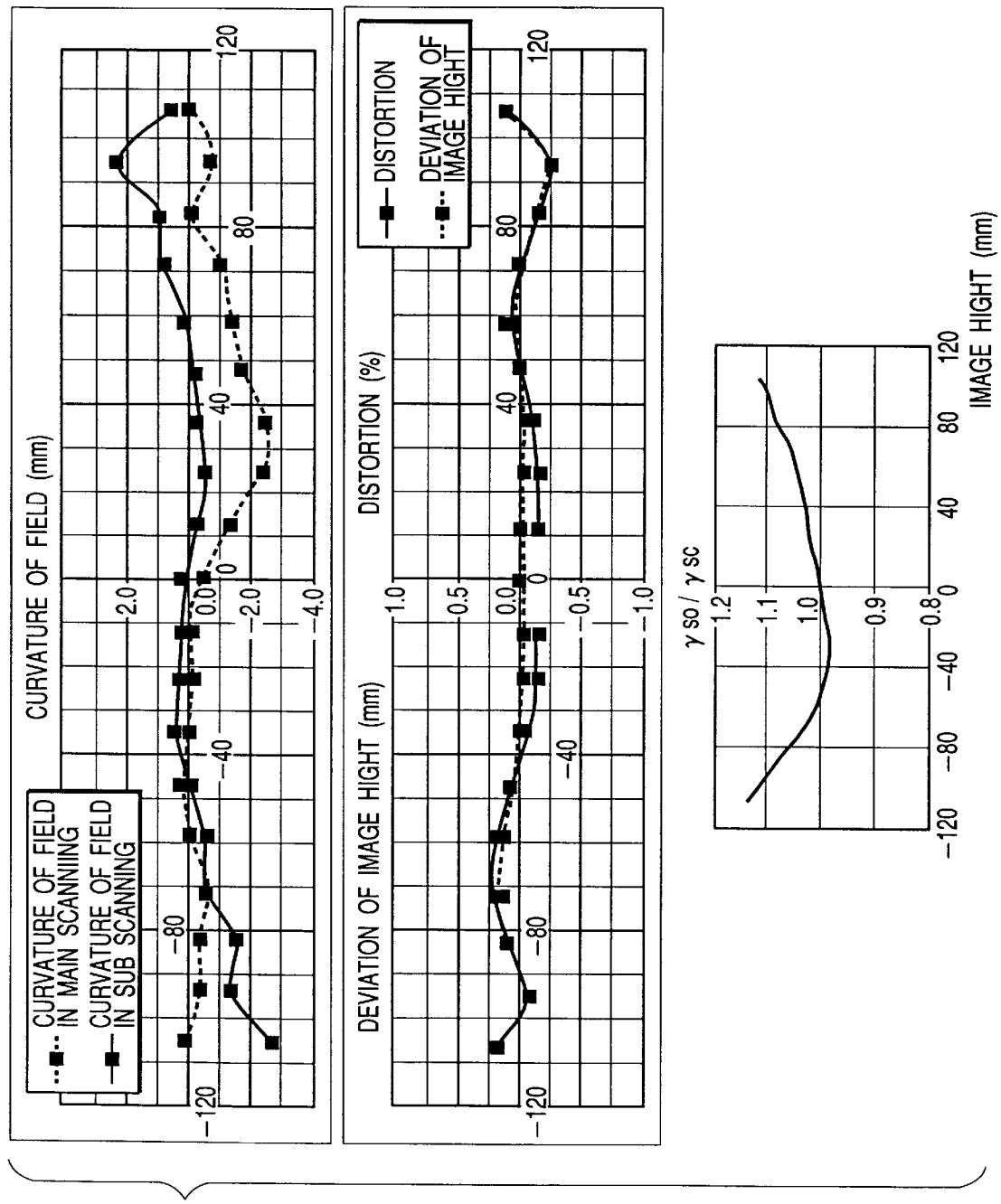
FIG. 5 is a drawing to show curvature of field, distortion, and change of angular magnification in Embodiment 2 of the present invention.

Table 2 below shows the coefficients for indicating the shapes of the lens surfaces and other various characteristics in Embodiment 2. FIG. 5 is an explanatory drawing to show aberration diagrams of curvature of field and distortion and change of angular magnification with the reference at the center in Embodiment 2. It is seen from the drawing that each of the aberrations is corrected for down to the level where there will arise no problem in practical use.

TABLE 2

| | | DATA | | | |
|---|---|---|---|---|---|
| Wavelength used | λ (nm) | 780 | Shape of toric lens | | |
| | | | | First face | Second face |
| Index of spherical lens | ns | 1.5242 | R | 4.12315E + 01 | 4.76163E + 01 |
| Index of toric lens | nt | 1.5242 | K | −7.35357E + 00 | −1.06514E + 01 |
| Angle of incidence to polygon | θi | −90.0 | B4 | −2.19394E − 06 | −2.59911E − 06 |
| Max out angle from polygon | θmax | 45.0 | 86 | 1.53043E − 10 | 1.77243E − 10 |
| Polygon-spherical lens | e1 | 25.0 | B8 | −1.12193E − 13 | −4.19341E − 14 |
| Center thickness of spherical lens | d1 | 5.6 | B10 | 2.49607E − 17 | −2.73683E − 17 |
| Spherical lens-toric lens | e2 | 5.4 | r | −2.05362E + 01 | −1.06757E + 01 |
| Center thickness of toric lens | d2 | 8.0 | D2 | 3.75941E − 03 | 1.65667E − 03 |
| Toric lens-scanned surface | Sk | 113.5 | D4 | 4.91305E − 06 | −6.73059E − 07 |
| Degree of convergence by collimator | | | D6 | 1.36972E − 08 | −9.92015E − 11 |
| polygon-naturally converging point | fc | 312.06 | D8 | −2.45565E − 11 | 8.32087E − 14 |
| Radius of curvature of spherical lens R1 | R1 | −43.465 | D10 | 3.51609E − 14 | 1.96687E − 18 |
| Radius of curvature of spherical lens R2 | R2 | −38.995 | | | |
| Focal length of spherical lens | f6 | 505.54 | | | |
| Focal length of toric lens | f7 | 409.94 | | | |
| Ratio of the focal lengths | f6/f7 | 1.233 | | | |
| Angular magnification | rsc | 0.404 | | | |

In the present embodiment the toric lens 27 is shifted 0.2 mm in parallel toward the light source means with respect to the normal of the scanned surface 8. Further, the toric lens 27 is arranged so that the symmetry axis thereof in the main scanning direction is inclined at 25 minutes clockwise about the rotational axis passing through the top point of the lens surface on the optical deflector 5 side in the main scanning plane with respect to the normal of the scanned surface 8.

Figure 6:
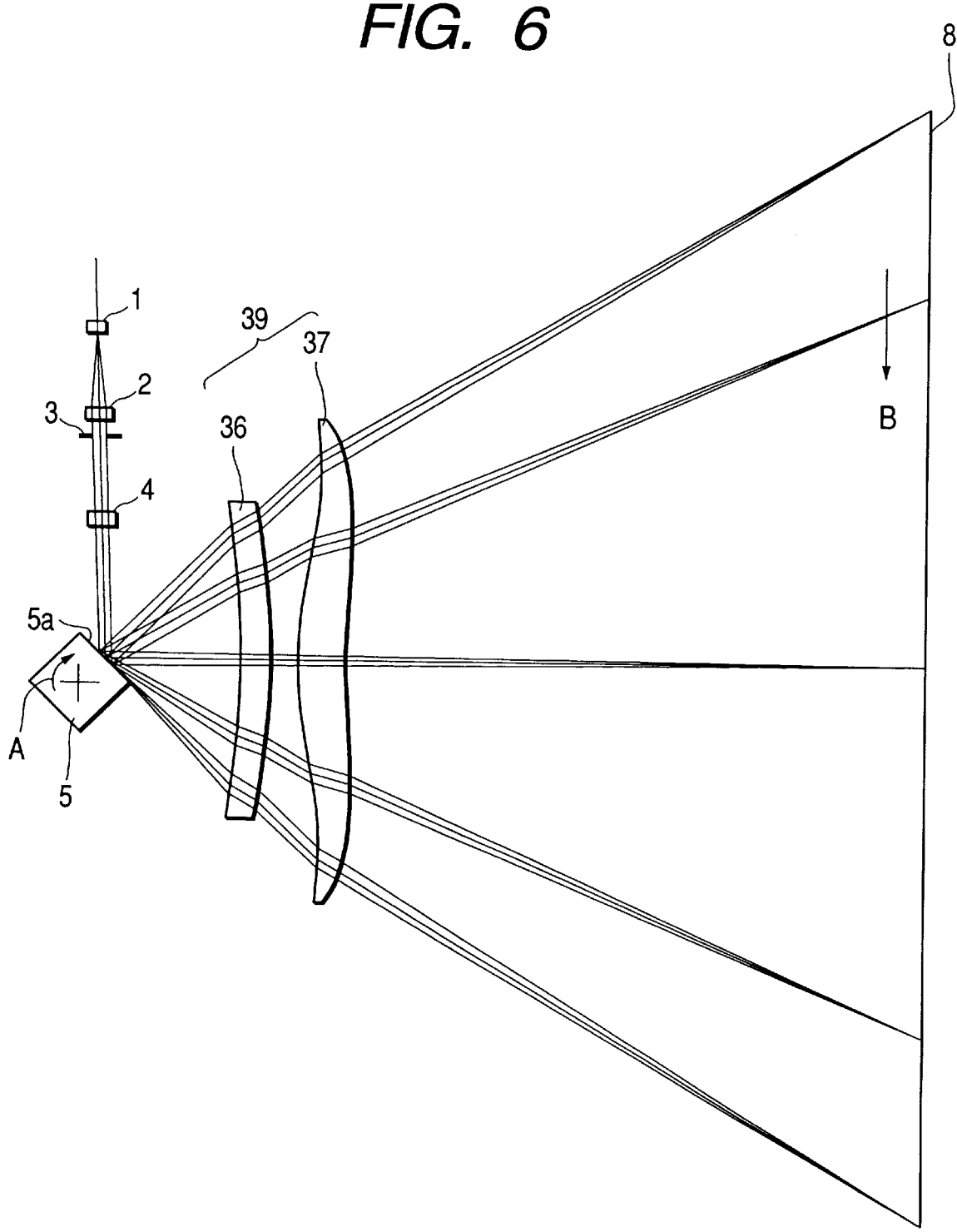
FIG. 6 is a cross-sectional view of the major part in the main scanning direction of Embodiment 3 of the scanning optical apparatus of the present invention.

FIG. 6 is a cross-sectional view of the major part in the main scanning direction (a main scanning cross-sectional view) of Embodiment 3 of the scanning optical apparatus according to the present invention. In the drawing the same elements as those shown in FIG. 2 are denoted by the same reference numerals.

The present embodiment is different from Embodiment 1 of FIG. 2 in that spherical lens 36 and toric lens 37 composing the third optical element 39 are constructed in respective lens shapes optimum for the polygon mirror composed of the four faces, as shown in Table 3 below. The other structure and optical action are substantially the same as in above Embodiment 1, thereby achieving the same effect.

Figure 7:
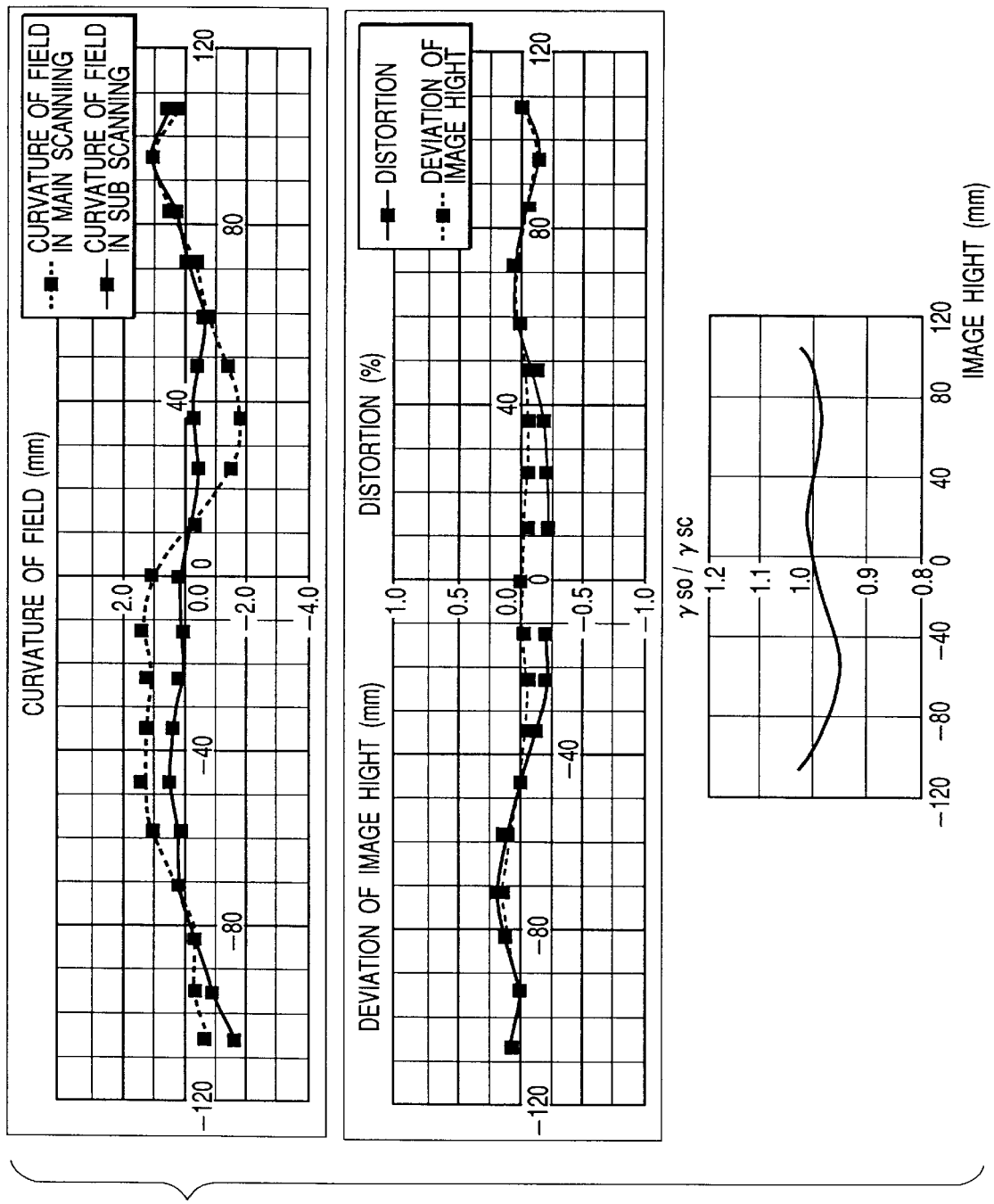
FIG. 7 is a drawing to show curvature of field, distortion, and change of angular magnification in Embodiment 3 of the present invention.
Figure 8:
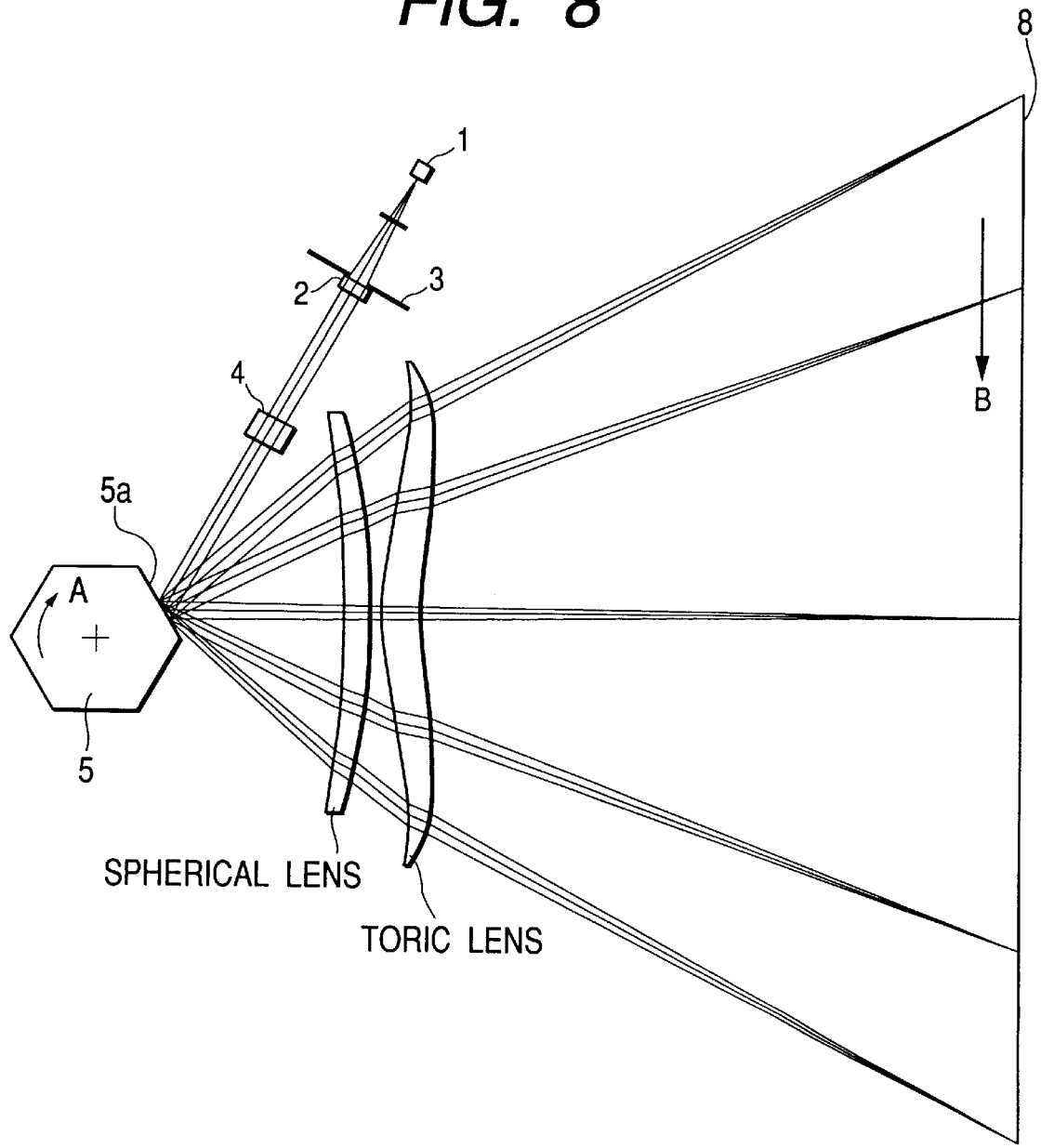
FIG. 8 is a cross-sectional view of the major part in the main scanning direction of Embodiment 4, 5, or 6 of the scanning optical apparatus of the present invention.

Table 3 below shows the coefficients for indicating the shapes of the lens surfaces and other various characteristics in Embodiment 3. FIG. 7 is an explanatory drawing to show aberration diagrams of curvature of field and distortion and change of angular magnification with the reference at the center in Embodiment 3. It is seen from the drawing that each of the aberrations is corrected for down to the level where there will arise no problem in practical use.

ments 4, 5, and 6 the shapes of the respective lenses are common in the main scanning section, and FIG. 8 is a cross-sectional view of the major part in the main scanning direction (a main scanning cross-sectional view), which is common to Embodiments 4, 5, and 6. In the drawing the same elements as those shown in FIG. 2 are denoted by the same reference numerals.

Each of Embodiments 4, 5, and 6 is different from Embodiment 1 of FIG. 2 described above only

- in that the polygon mirror as a deflecting element is composed of six faces for the purpose of high-speed printer; and
- in that the spherical lens and toric lens composing the third optical element are constructed in respective lens shapes optimum for the polygon mirror composed of the six faces, as shown in Table 4, 5, or 6 below.

The other structure and optical action of each embodiment 4, 5, or 6 are substantially the same as in Embodiment 1 described above, thereby achieving the same effect.

Figure 9:
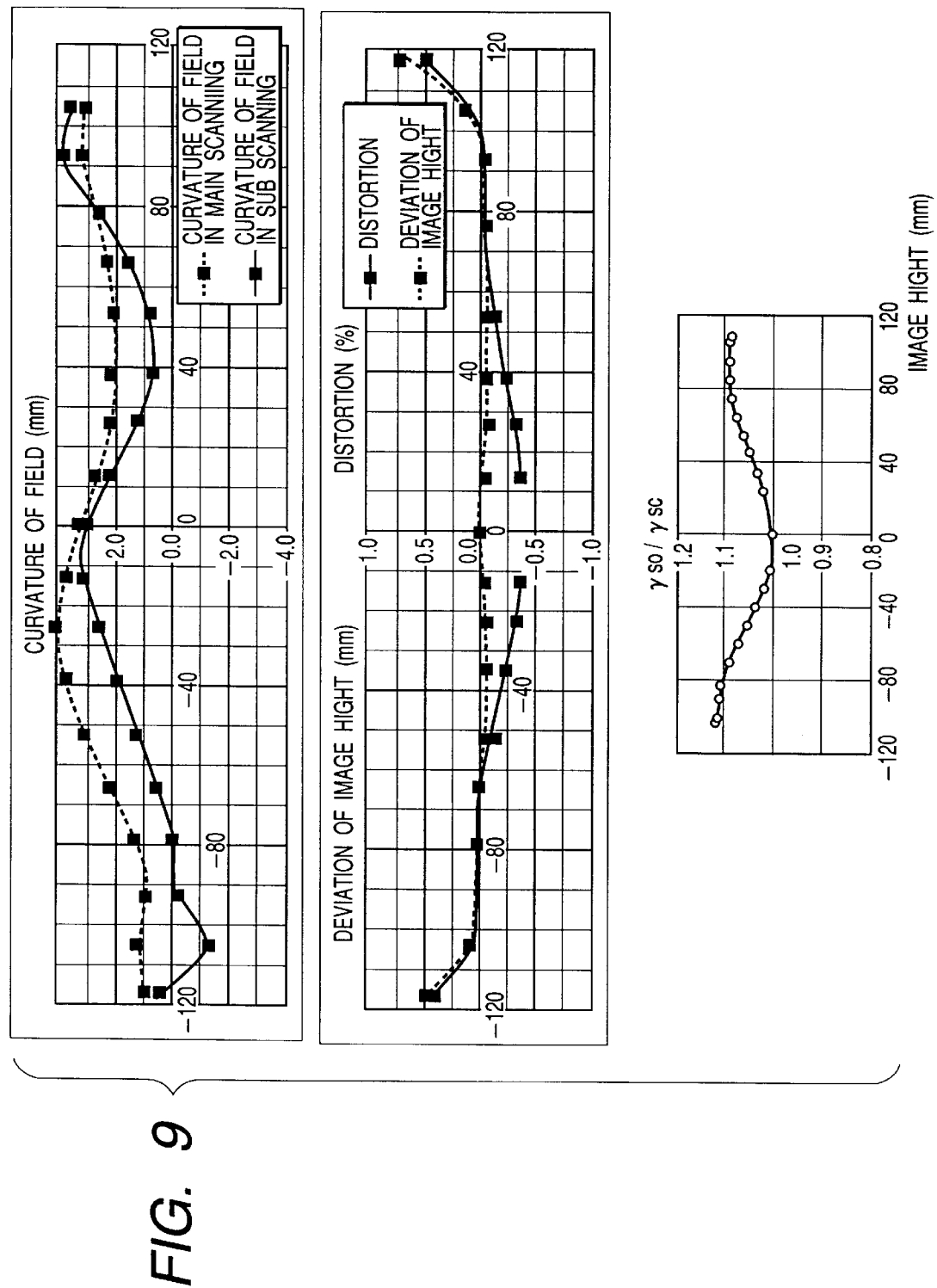
FIG. 9 is a drawing to show curvature of field, distortion, and changes of angular magnification in Embodiment 4 of the present invention.
Figure 10:
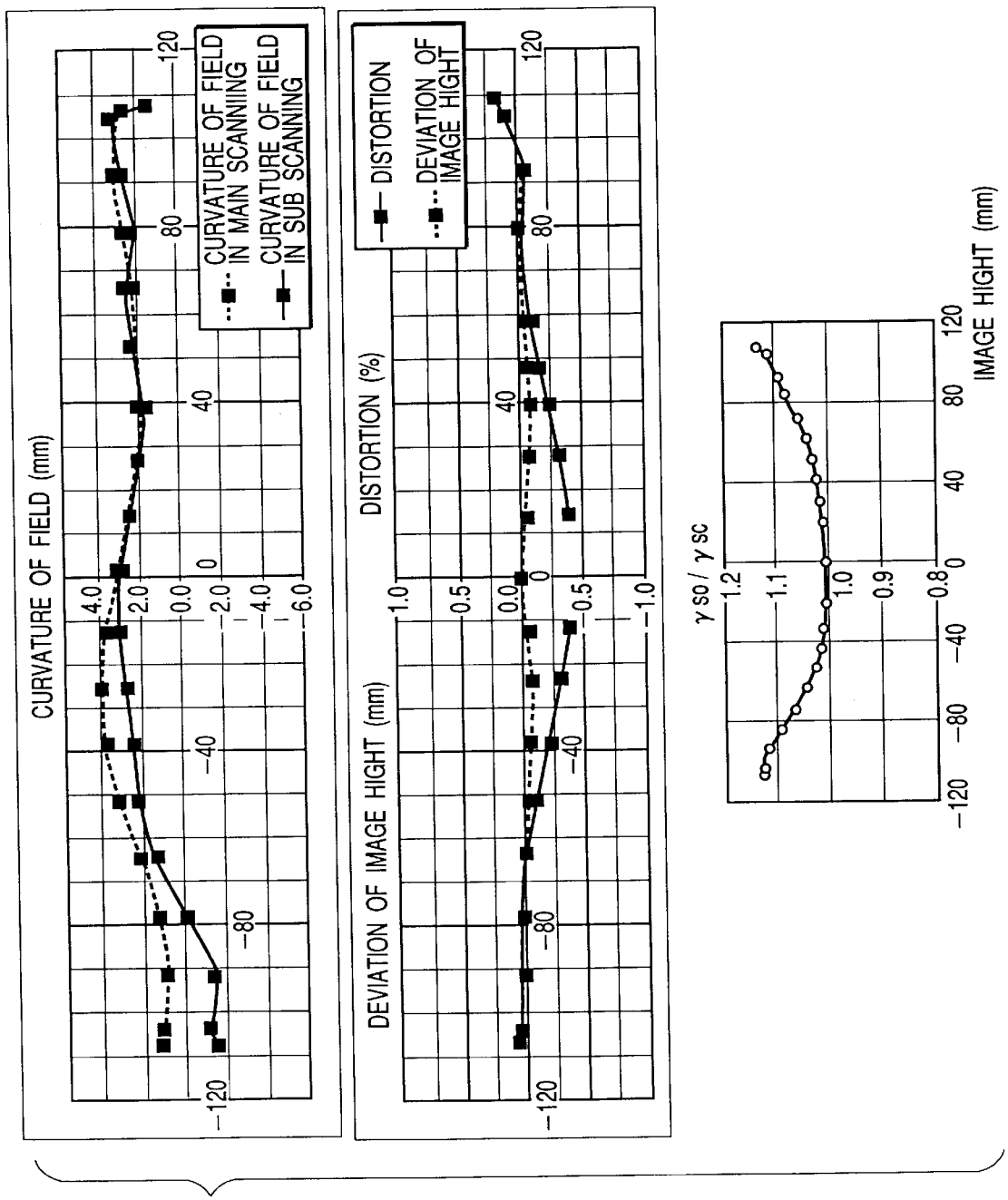
FIG. 10 is a drawing to show curvature of field, distortion, and changes of angular magnification in Embodiment 5 of the present invention.
Figure 11:
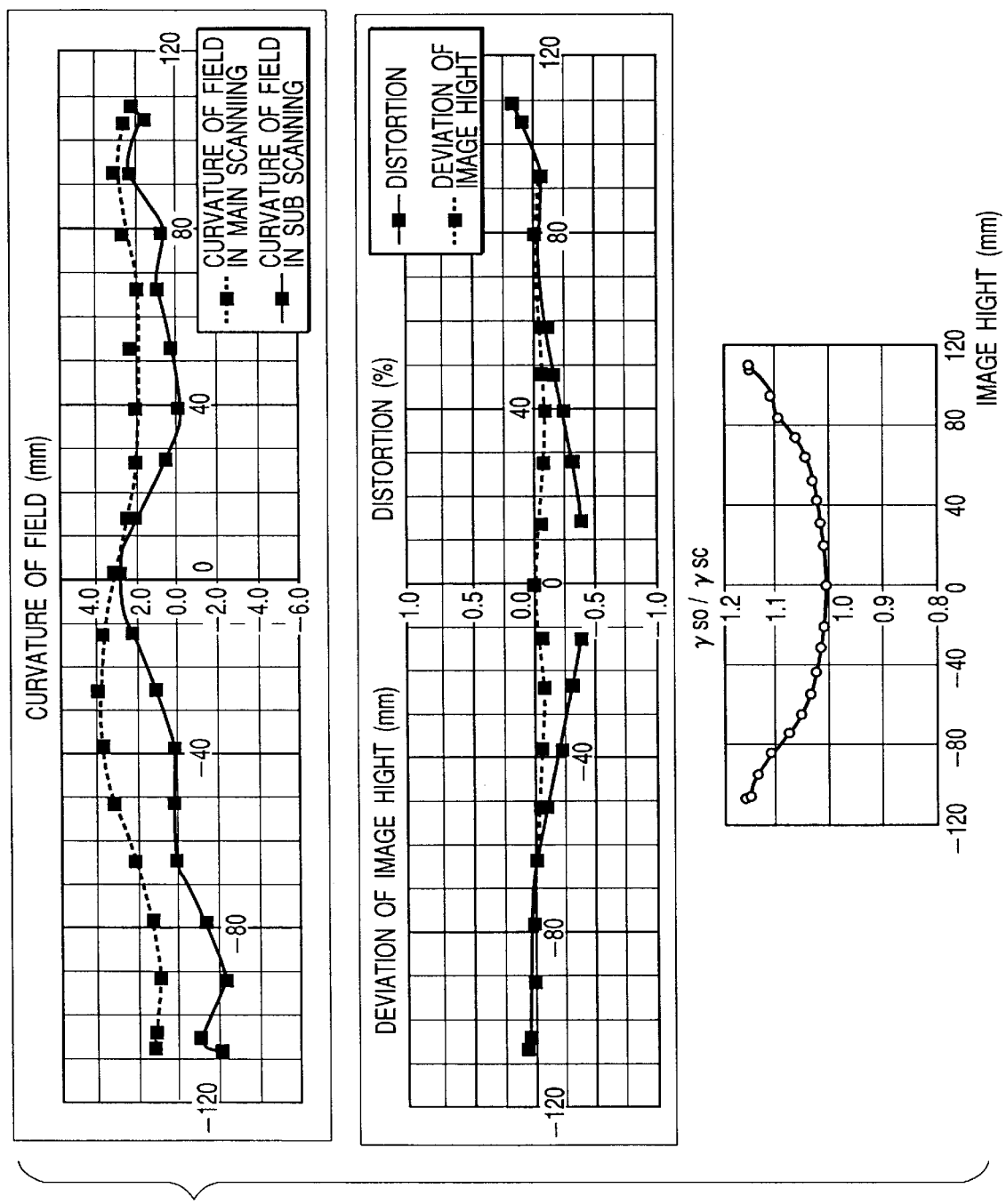
FIG. 11 is a drawing to show curvature of field, distortion, and changes of angular magnification in Embodiment 6 of the present invention.

Table 4, 5, or 6 shows the coefficients for expressing the shapes of the lens surfaces and other various characteristics in each embodiment 4, 5, or 6. FIG. 9, 10, or 11 is an explanatory drawing to show aberration diagrams of curvature of field and distortion and change of angular magnification with the reference at the center in each embodiment 4, 5, or 6. It is seen from each drawing that each of the aberrations is corrected for down to the level where there will arise no problem in practical use.

TABLE 3

| | | DATA | | |
|---|---|---|---|---|
| Wavelength used | $\lambda$ (nm) | 780 | Shape of toric lens | |
| Index of spherical lens | ns | 1.5242 | First face | Second face |
| Index of toric lens | nt | 1.5242 | R  6.23395E + 01 | 1.13261E + 02 |
| Angle of incidence to polygon | $\theta i$ | −90.0 | K  −1.31335E + 01 | −5.22153E + 01 |
| Max out angle from polygon | $\theta max$ | 45.0 | B4  −1.47004E − 06 | −2.01508E − 06 |
| Polygon-spherical lens | e1 | 25.0 | B6  2.19952E − 10 | 1.89102E − 10 |
| Center thickness of spherical lens | d1 | 5.6 | B8  −8.37295E − 14 | −4.80242E − 14 |
| spherical lens-toric lens | e2 | 5.4 | B10  1.39711E − 17 | −1.54869E − 17 |
| Center thickness of toric lens | d2 | 9.15 | r  −1.81836E + 01 | −1.02296E + 01 |
| Toric lens-scanned surface | Sk | 112.35 | D2  4.98453E − 03 | 1.52646E − 03 |
| Degree of convergence by collimator | | | D4  5.91930E − 06 | −6.58541E − 07 |
| polygon-naturally converging point | fc | 312.06 | D6  1.85391E − 08 | −2.56142E − 11 |
| Radius of curvature of spherical lens R1 | R1 | −192.19 | D8  −2.65573E − 11 | 1.00622E − 13 |
| Radius of curvature of spherical lens R2 | R2 | −164.06 | D10  3.46167E − 14 | −2.36684E − 17 |
| Focal length of spherical lens | f6 | 1996.9 | | |
| Focal length of toric lens | f7 | 248.50 | | |
| Ratio of the focal lengths | f6/f7 | 8.036 | | |
| Angular magnification | rsc | 0.424 | | |

In the present embodiment the toric lens 37 is shifted 0.4 mm in parallel toward the light source means with respect to the normal of the scanned surface 8. Further, the toric lens 37 is arranged so that the symmetry axis thereof in the main scanning direction is inclined at 25 minutes clockwise about the rotational axis passing through the top point of the lens surface on the optical deflector 5 side in the main scanning plane with respect to the normal of the scanned surface 8.

Embodiments 4, 5, and 6 of the scanning optical apparatus of the present invention will be described below. In Embodi-

TABLE 4

(unit: mm, E-OX means "$10^{-X}$")

DATA

| Wavelength used | λ (nm) | 780 | Shape of toric lens | | |
|---|---|---|---|---|---|
| | | | | First face | Second face |
| Index of spherical lens | ns | 1.5242 | | | |
| Index of toric lens | nt | 1.5242 | R | 6.23341E + 01 | 8.68550E + 01 |
| Angle of incidence to polygon | θi | −60.0 | K | −9.37019E + 00 | −1.83238E + 01 |
| Max out angle from polygon | θmax | 41.0 | B4 | −1.47610E − 06 | −1.86679E − 06 |
| Polygon-spherical lens | e1 | 36.4 | B6 | 3.46212E − 10 | 3.86512E − 10 |
| Center thickness of spherical lens | d1 | 5.3 | B8 | −1.18693E − 13 | −1.22439E − 13 |
| Spherical lens-toric lens | e2 | 2.5 | B10 | 1.71530E − 17 | 1.09562E − 17 |
| Center thickness of toric lens | d2 | 7.8 | r | −2.11003E + 01 | −1.15000E + 01 |
| Toric lens-scanned surface | Sk | 122 | D2 | 0.00000E + 00 | 2.27836E − 04 |
| Degree of convergence by collimator | | | D4 | 7.00000E − 07 | −1.18222E − 07 |
| polygon-naturally converging point | fc | 339.6 | D6 | 0.00000E + 00 | 2.93772E − 10 |
| Radius of curvature of spherical lens R1 | R1 | −260.40 | D8 | 0.00000E + 00 | −1.80466E − 13 |
| Radius of curvature of spherical lens R2 | R2 | −150.90 | D10 | 0.00000E + 00 | 3.58710E − 17 |
| Focal length of spherical lens | f6 | 673.6 | | | |
| Focal length of toric lens | f7 | 379.7 | | | |
| Ratio of the focal lengths | f6/f7 | 1.77 | | | |
| Angular magnification | rsc | 0.43 | | | |

TABLE 5

DATA

| Wavelength used | λ (nm) | 780 | Shape of toric lens | | |
|---|---|---|---|---|---|
| | | | | First face | Second face |
| Index of spherical lens | ns | 1.5242 | | | |
| Index of toric lens | nt | 1.5242 | R | 6.23341E + 01 | 8.68550E + 01 |
| Angle of incidence to polygon | θi | −60.0 | K | −9.37019E + 00 | −1.83238E + 01 |
| Max out angle from polygon | θmax | 41.0 | B4 | −1.47610E − 06 | −1.86679E − 06 |
| polygon-spherical lens | e1 | 36.4 | B6 | 3.46212E − 10 | 3.86512E − 10 |
| Center thickness of spherical lens | d1 | 5.3 | 88 | −1.18693E − 13 | −1.22439E − 13 |
| Spherical lens-toric lens | e2 | 2.5 | 810 | 1.71530E − 17 | 1.09562E − 17 |
| Center thickness of toric lens | d2 | 7.8 | r | −2.11003E + 01 | −1.15000E + 01 |
| Toric lens-scanned surface | Sk | 122 | D2 | 1.50000E − 03 | 7.05420E − 04 |
| Degree of convergence by collimator | | | D4 | −6.50000E − 07 | −5.30841E − 07 |
| polygon-naturally converging point | fc | 339.6 | D6 | 0.00000E + 00 | 1.72712R − 10 |
| Radius of curvature of spherical lens R1 | R1 | −260.40 | D8 | 0.00000E + 00 | −1.21162E − 14 |
| Radius of curvature of spherical lens R2 | R2 | −150.90 | D10 | 0.00000E + 00 | −8.50250E − 18 |
| Focal length of spherical lens | f6 | 673.6 | | | |
| Focal length of toric lens | f7 | 379.7 | | | |
| Ratio of the focal lengths | f6/f7 | 1.77 | | | |
| Angular magnification | rsc | 0.43 | | | |

TABLE 6

DATA

| Wavelength used | λ (nm) | 780 | Shape of toric lens | | |
|---|---|---|---|---|---|
| | | | | First face | Second face |
| Index of spherical lens | ns | 1.5242 | | | |
| Index of toric lens | nt | 1.5242 | R | 6.23341E + 01 | 8.68550E + D1 |
| Angle of incidence to polygon | θi | −60.0# | K | −9.37019E + 00 | −1.83238E + 01 |
| Max out angle from polygon | θmax | 41.0 | B4 | −1.47610E − 06 | −1.86679E − 06 |
| Polygon-spherical lens | e1 | 36.4 | B6 | 3.46212E − 10 | 3.86512E − 10 |
| Center thickness of spherical lens | d1 | 5.3 | B8 | −1.18693E − 13 | −1.22439E − 13 |
| Spherical lens-toric lens | e2 | 2.5 | B10 | 1.71530E − 17 | 1.09562E − 17 |
| Center thickness of toric lens | d2 | 7.8 | r | −2.11003E + 01 | −1.15000E + 01 |
| Toric lens-scanned surface | Sk | 122 | D2 | 2.47000E − 03 | 9.61160E − D4 |
| Degree of convergence by collimator | | | D4 | −1.38000E − 06 | −8.93747E − 07 |
| polygon-naturally converging point | fc | 339.6 | D6 | −1.76000E − 09 | 2.33314E − 10 |
| Radius of curvature of spherical lens R1 | R1 | −260.40 | D8 | 1.70000E − 12 | 1.30810E − 15 |

TABLE 6-continued

| Radius of curvature of spherical lens R2 | R2 | −150.90 | D10 | −4.00000E − 16 | −7.97730E − 18 |
|---|---|---|---|---|---|
| Focal length of spherical lens | f6 | 673.6 | | | |
| Focal length of toric lens | f7 | 379.7 | | | |
| Ratio of the focal lengths | f6/f7 | 1.77 | | | |
| Angular magnification | rsc | 0.43 | | | |

In each embodiment 4, 5, or 6 the spherical lens and toric lens both are shifted 0.2 mm in parallel toward the light source means with respect to the normal of the scanned surface 8. Further, in each embodiment 4, 5, or 6 the toric lens is arranged so that the symmetry axis thereof in the main scanning direction is inclined at 36 minutes clockwise about the rotational axis passing through the top point of the lens surface on the deflecting element 5 side in the main scanning plane with respect to the normal of the scanned surface.

The present invention can well correct for the aberration including the curvature of field and distortion and can minimize the influence of change of spot diameter depending upon heights of image or the like, by such arrangement that, for focusing the converging light from the collimator lens on the scanned surface by the fθ lens comprised of the two lenses via the optical deflector, the lens shapes of the two lenses of the fθ lens are set adequately as described above, whereby the present invention can achieve the scanning optical apparatus that is compact and suitable for high-definition printing.

Since the center thickness of each lens of the fθ lens along the optical-axis direction can be made thinner by the arrangement of the fθ lens comprised of the two lenses, the tact time of molding can be decreased when the two lenses are made by molding of plastic, whereby a cheaper scanning optical apparatus can be realized.

What is claimed is:

1. A scanning optical apparatus comprising:

light source means;

a first optical element for converting a beam emitted from said light source means to a converging light beam;

a deflecting element for deflecting the beam emitted from said light source means;

a second optical element for focusing the beam emerging from said first optical element in a linear shape longitudinal in a main scanning direction on a deflective face of said deflecting element; and a third optical element for focusing the beam deflected by said deflecting element in a spot shape on a scanned surface, wherein said third optical element has a spherical lens and a toric lens in order from the side of the deflecting element, surfaces of the spherical lens comprise a meniscus shape of positive refracting power with a concave surface faced toward the deflecting element, and the toric lens has two lens surfaces formed in aspherical shapes in a main scanning section and comprising a meniscus shape of positive refracting power with a convex surface faced toward the deflecting element in the vicinity of a center of scan.

2. The scanning optical apparatus according to claim 1, wherein said toric lens is constructed so that in the main scanning section curvatures of the lens surface thereof on the side of said scanned surface continuously change from a center of the lens to a periphery of lens and signs thereof are inverted in an intermediate portion thereof.

3. The scanning optical apparatus according to claim 1, wherein said toric lens is produced by molding of plastic.

4. The scanning optical apparatus according to claim 1, wherein said toric lens is constructed so that curvatures of at least one lens surface thereof out of the lens surfaces on the side of said deflecting element or on the side of the scanned surface in sub scanning sections change continuously along the main scanning direction.

5. The scanning optical apparatus according to claim 4, wherein the curvatures of said at least one lens surface change continuously along the main scanning direction in plane symmetry of the lens center.

6. The scanning optical apparatus according to claim 1, wherein said toric lens is constructed so that a symmetry axis thereof in the main scanning direction is inclined with respect to a normal of said scanned surface in a main scanning plane.

7. The scanning optical apparatus according to claim 1, wherein when focal lengths of said spherical lens and said toric lens in the main scanning section are f6 and f7, respectively, the focal lengths satisfy:

$$1.6 < f6/f7 < 2.4.$$

8. The scanning optical apparatus according to claim 1, wherein said toric lens is decentered in parallel toward the light source means in the main scanning section.

9. The scanning optical apparatus according to claim 1, wherein said third optical element is arranged so that when an angular magnification of an effective image center portion on the scanned surface in a sub scanning section between said deflecting element and said scanned surface is $r_{sc}$, the angular magnification $r_{sc}$ satisfies:

$$0.25 < r_{sc} < 0.67.$$

10. The scanning optical apparatus according to claim 1, wherein refracting power of said toric lens in a sub scanning section becomes continuously weaker from a center of the lens to a periphery of the lens and said third optical element is arranged so that when an angular magnification of an effective image center portion on the scanned surface in a sub scanning section between said deflecting element and said scanned surface is $r_{sc}$ and an angular magnification at an arbitrary position in an entire region of an image is $r_{s0}$, the angular magnifications satisfy:

$$0.9 < r_{s0}/r_{sc} < 1.25.$$

11. A scanning optical apparatus comprising:

light source means;

a first optical element for converting a beam emitted from said light source means to a converging light beam;

a deflecting element for deflecting the beam emitted from said light source means;

a second optical element for focusing the beam emerging from said first optical element in a linear shape longitudinal in a main scanning direction on a deflective face of said deflecting element; and a third optical element for focusing the beam deflected by said deflecting element in a spot shape on a scanned surface, wherein said third optical element has a spherical lens and a toric lens in order from the side of the deflecting element, the spherical lens comprises a meniscus shape of positive refracting power with a concave surface faced toward the deflecting element, and the toric lens has two lens surfaces formed in aspherical shapes in a main scanning section and comprising a meniscus shape of positive refracting power with a convex surface faced toward the deflecting element in the vicinity of a center of scan, and wherein when focal lengths of said spherical lens and said toric lens in the main scanning section are f6 and f7, respectively, the focal lengths satisfy:

$1<f6/f7<10.$

12. The scanning optical apparatus according to claim 11, wherein said toric lens is constructed so in the main scanning section that curvatures of the lens surface thereof on the side of said scanned surface continuously change from a center of the lens to a periphery of lens and signs thereof are inverted in an intermediate portion thereof.

13. The scanning optical apparatus according to claim 11, wherein said toric lens is produced by molding of plastic.

14. The scanning optical apparatus according to claim 11, wherein said toric lens is constructed so that curvatures of at least one lens surface thereof out of the lens surfaces on the side of said deflecting element or on the side of the scanned surface in sub scanning sections change continuously along the main scanning direction.

15. The scanning optical apparatus according to claim 14, wherein the curvatures of said at least one lens surface change continuously along the main scanning direction in plane symmetry of the lens center.

16. The scanning optical apparatus according to claim 11, wherein said toric lens is constructed so that a symmetry axis thereof in the main scanning direction is inclined with respect to a normal of said scanned surface in a main scanning plane.

17. The scanning optical apparatus according to claim 11, wherein said toric lens is decentered in parallel toward the light source means in the main scanning section.

18. The scanning optical apparatus according to claim 11, wherein said third optical element is arranged so that when an angular magnification of an effective image center portion on the scanned surface in a sub scanning section between said deflecting element and said scanned surface is $r_{sc}$, the angular magnification $r_{sc}$ satisfies the following condition:

$0.25<r_{sc}<0.67.$

19. The scanning optical apparatus according to claim 11, wherein refracting power of said toric lens in a sub scanning section becomes continuously weaker from a center of the lens to the periphery of a lens and said third optical element is arranged so that when an angular magnification of an effective image center portion on the scanned surface in a sub scanning section between said deflecting element and said scanned surface is $r_{sc}$ and an angular magnification at an arbitrary position in an entire region of an image is $r_{s0}$, the angular magnifications satisfy:

$0.9<r_{s0}/r_{sc}<1.25.$

20. A laser beam printer apparatus comprising:

light source means;

a first optical element for converting a beam emitted from said light source means to a converging light beam;

a deflecting element for deflecting the beam emitted from said light source means;

a second optical element for focusing the beam emerging from said first optical element in a linear shape longitudinal in a main scanning direction on a deflective face of said deflecting element;

a recording medium; and a third optical element for focusing the beam deflected by said deflecting element in a spot shape on a surface of said recording medium, wherein said third optical element has a spherical lens and a toric lens in order from the side of the deflecting element, surfaces of the spherical lens comprise a meniscus shape of positive refracting power with a concave surface faced toward the deflecting element, and the toric lens has two lens surfaces formed in aspherical shapes in a main scanning section and comprising a meniscus shape of positive refracting power with a convex surface faced toward the deflecting element in the vicinity of a center of scan.

21. The laser beam printer apparatus according to claim 20, wherein said toric lens is constructed so that in the main scanning section curvatures of the lens surface thereof on the side of said surface of the recording medium continuously change from a center of the lens to a periphery of lens and signs thereof are inverted in an intermediate portion thereof.

22. The laser beam printer apparatus according to claim 20, wherein said toric lens is produced by molding of plastic.

23. The laser beam printer apparatus according to claim 20, wherein said toric lens is constructed so that curvatures of at least one lens surface thereof out of the lens surfaces on the side of said deflecting element or on the side of the surface of the recording medium in sub scanning sections change continuously along the main scanning direction.

24. The laser beam printer apparatus according to claim 23, wherein the curvatures of said at least one lens surface change continuously along the main scanning direction in plane symmetry of the lens center.

25. The laser beam printer apparatus according to claim 20, wherein said toric lens is constructed so that a symmetry axis thereof in the main scanning direction is inclined with respect to a normal of said surface of the recording medium in the main scanning plane.

26. The laser beam printer apparatus according to claim 20, wherein when focal lengths of said spherical lens and said toric lens in the main scanning section are f6 and f7, respectively, the focal lengths satisfy:

$1.6<f6/f7<2.4.$

27. The laser beam printer apparatus according to claim 20, wherein said toric lens is decentered in parallel toward the light source means in the main scanning section.

28. The laser beam printer apparatus according to claim 20, wherein said third optical element is arranged so that when an angular magnification of an effective image enter portion on the surface of the recording medium in the sub scanning section between said deflecting element and said surface of the recording medium is $r_{sc}$, the angular magnification $r_{sc}$ satisfies:

$0.25<r_{sc}<0.67.$

29. The laser beam printer apparatus according to claim 20, wherein refracting power of said toric lens in a sub scanning section becomes continuously weaker from a center of the lens to a periphery of the lens and said third optical element is arranged so that when an angular magnification of an effective image center portion on the surface of the recording medium in a sub scanning section between said deflecting element and said surface of the recording medium is $r_{sc}$ and an angular magnification at an arbitrary position in an entire region of an image is $r_{sO}$, the angular magnifications satisfy:

$$0.9 < r_{sO}/r_{sc} < 1.25.$$

30. A laser beam printer apparatus comprising:
light source means;
a first optical element for converting a beam emitted from said light source means to a converging light beam;
a deflecting element for deflecting the beam emitted from said light source means;
a second optical element for focusing the beam emerging from said first optical element in a linear shape longitudinal in a main scanning direction on a deflective face of said deflecting element;
a recording medium; and
a third optical element for focusing the beam deflected by said deflecting element in a spot shape on a surface of said recording medium,
wherein said third optical element has a spherical lens and a toric lens in order from the side of the deflecting element, the spherical lens comprises a meniscus shape of positive refracting power with a concave surface faced toward the deflecting element, and the toric lens has two lens surfaces formed in aspherical shapes in a main scanning section and comprising a meniscus shape of positive refracting power with a convex surface faced toward the deflecting element in the vicinity of a center of scan, and
wherein when focal lengths of said spherical lens and said toric lens in the main scanning section are f6 and f7, respectively, the focal lengths satisfy:

$$1 < f6/f7 < 10.$$

31. The laser beam printer apparatus according to claim 30, wherein said toric lens is constructed so that in the main scanning section curvatures of the lens surface thereof on the side of the surface of said recording medium continuously change from the center of the lens to the periphery of lens and signs thereof are inverted in an intermediate portion thereof.

32. The laser beam printer apparatus according to claim 30, wherein said toric lens is produced by molding of plastic.

33. The laser beam printer apparatus according to claim 30, wherein said toric lens is constructed so that curvatures of at least one lens surface thereof out of the lens surfaces on the side of said deflecting element or on the side of the surface of the recording medium in sub scanning sections change continuously along the main scanning direction.

34. The laser beam printer apparatus according to claim 33, wherein the curvatures of said at least one lens surface change continuously along the main scanning direction in plane symmetry of the lens center.

35. The laser beam printer apparatus according to claim 30, wherein said toric lens is constructed so that a symmetry axis thereof in the main scanning direction is inclined with respect to a normal of said surface of the recording medium in a main scanning plane.

36. The laser beam printer apparatus according to claim 30, wherein said toric lens is decentered in parallel toward the light source means in the main scanning section.

37. The laser beam printer apparatus according to claim 30, wherein said third optical element is arranged so that when an angular magnification of an effective image center portion on the surface of the recording medium in a sub scanning section between said deflecting element and said surface of the recording medium is $r_{sc}$, the angular magnification $r_{sc}$ satisfies:

$$0.25 < r_{sc} < 0.67.$$

38. The laser beam printer apparatus according to claim 30, wherein refracting power of said toric lens in a sub scanning section becomes continuously weaker from a center of the lens to a periphery of the lens and said third optical element is arranged so that when an angular magnification of an effective image center portion on the surface of the recording medium in a sub scanning section between said deflecting element and said surface of the recording medium is $r_{sc}$ and an angular magnification at an arbitrary position in an entire region of an image is $r_{sO}$, the angular magnifications satisfy:

$$0.9 < r_{sO}/r_{sc} < 1.25.$$

* * * * *

UNITED STATES PATENT AND TRADEMARK OFFICE
CERTIFICATE OF CORRECTION

PATENT NO. : 5,995,131

DATED : November 30, 1999

INVENTOR(S) : KAZUO FUJIBAYASHI, ET AL.

It is certified that error appears in the above-identified patent and that said Letters Patent is hereby corrected as shown below:

SHEET 3:
   Figure 3, "HIGHT" (all occurrences) should read --HEIGHT--.

SHEET 5:
   Figure 5, "HIGHT" (all occurrences) should read --HEIGHT--.

SHEET 7:
   Figure 7, "HIGHT" (all occurrences) should read --HEIGHT--.

SHEET 9:
   Figure 9, "HIGHT" (all occurrences) should read --HEIGHT--.

SHEET 10:
   Figure 10, "HIGHT" (all occurrences) should read --HEIGHT--.

SHEET 11:
   Figure 11, "HIGHT" (all occurrences) should read --HEIGHT--.

UNITED STATES PATENT AND TRADEMARK OFFICE
CERTIFICATE OF CORRECTION

PATENT NO. : 5,995,131

DATED : November 30, 1999

INVENTOR(S) : KAZUO FUJIBAYASHI, ET AL.

It is certified that error appears in the above-identified patent and that said Letters Patent is hereby corrected as shown below:

COLUMN 1:
   Line 26, "fe" should read --f$\theta$--.
   Line 31, "cross—sectional" should read --cross-sectional--.

COLUMN 2:
   Line 34, "fo" should read --f$\theta$--.

COLUMN 5:
   Line 59, "by," should read --by a--.

COLUMN 7:
   Line 23, "the both" should read --both the--.

COLUMN 10:
   Table 2, "Polygon-spherical lens  el 25.0 86" should read --Polygon-spherical lens  el 25.0 B6--.

COLUMN 13:
   Table 5, "Center thickness of spherical lens dl 5.3 88" should read --Center thickness of spherical lens dl 5.3 B8--; "Spherical lens-toric lens e2 2.5 810" should read --Spherical lens-toric lens e2 2.5 B10--; and "1.72712R-10" should read --1.72712E-10--.

UNITED STATES PATENT AND TRADEMARK OFFICE
CERTIFICATE OF CORRECTION

PATENT NO. : 5,995,131

DATED : November 30, 1999

INVENTOR(S) : KAZUO FUJIBAYASHI, ET AL.

It is certified that error appears in the above-identified patent and that said Letters Patent is hereby corrected as shown below:

COLUMN 13:
    Table 6, "-60.0#" should read --60.0--; and "8.68550E+D1" should read --8.68550E + 01--; and "9.61160E - D4" should read --9.61160E - 04--.

COLUMN 17:
    Line 52, "satisfies the following" should read --satisfies:--.
    Line 53, "condition:" should be deleted.

Line 59, "the" should read --a--; and "a" should read --the--.

Signed and Sealed this

Twenty-second Day of May, 2001

*Attest:*

NICHOLAS P. GODICI

*Attesting Officer*     *Acting Director of the United States Patent and Trademark Office*